United States Patent Office 3,426,209
Patented Feb. 4, 1969

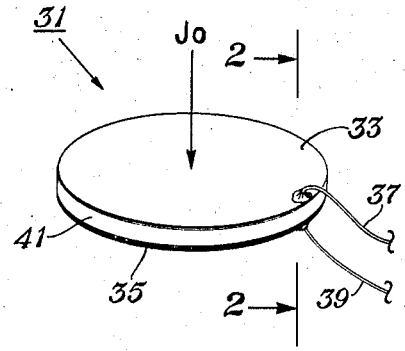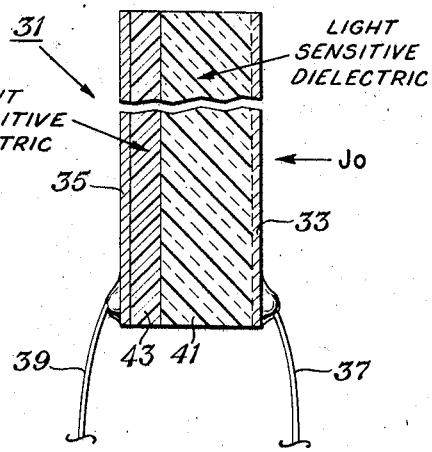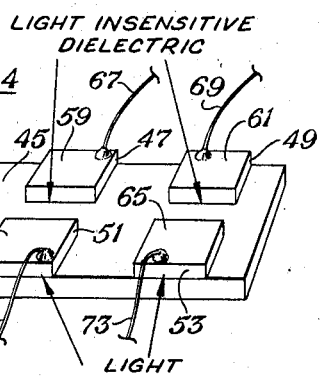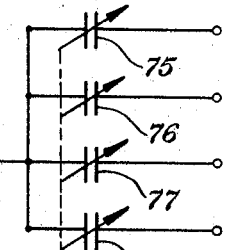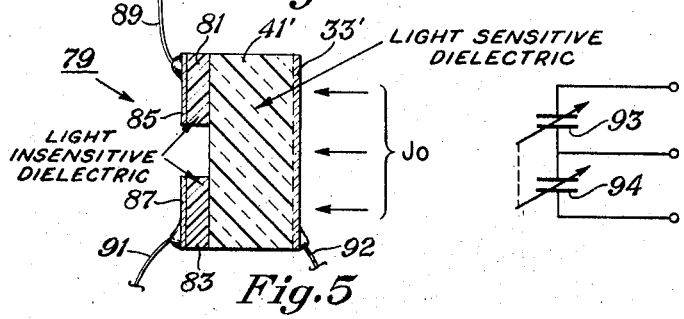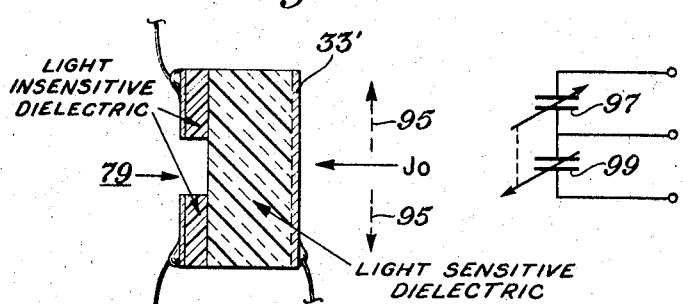
INVENTORS.
YRO T. SIHVONEN
DAVID R. BOYD
EARLE L. KITTS, JR.
BY William D. Harris, Jr.
ATTORNEY

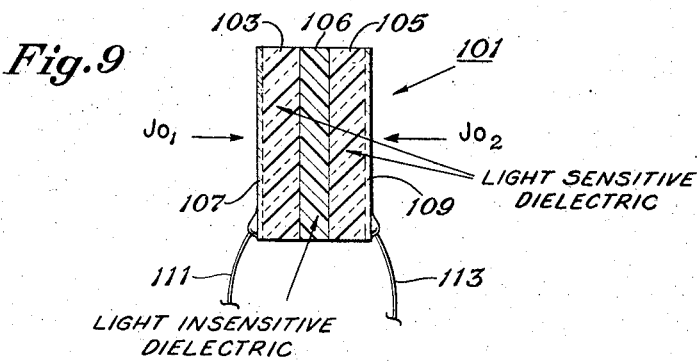
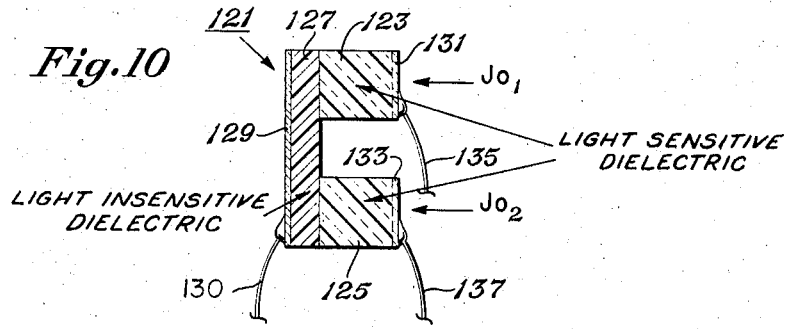
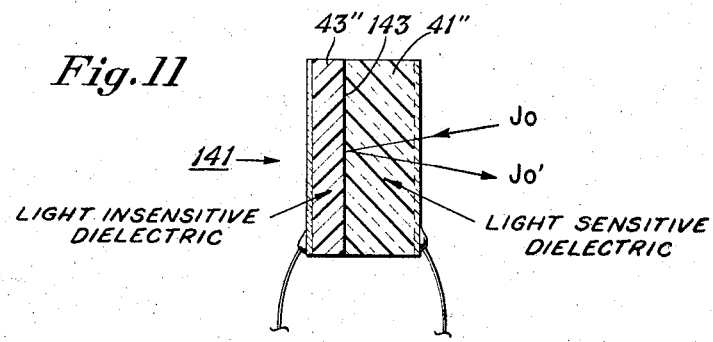
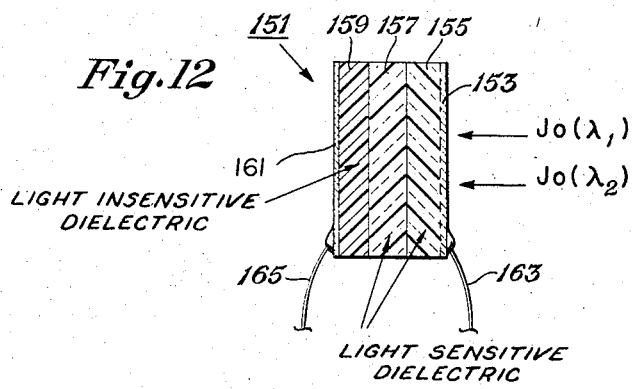

3,426,209
LIGHT RESPONSIVE VARIABLE CAPACITOR
Yro T. Sihvonen and David R. Boyd, Richardson, and Earle L. Kitts, Jr., Dallas, Tex., assignors to Texas Instruments Incorporated, Dallas, Tex., a corporation of Delaware
Continuation of application Ser. No. 376,926, June 22, 1964. This application Sept. 11, 1967, Ser. No. 667,012
U.S. Cl. 250—211                          9 Claims
Int. Cl. H01j 39/12; G01j 1/46

ABSTRACT OF THE DISCLOSURE

A capacitor structure which varies in capacitance in response to the application of light thereto. The capacitor includes at least two conductive plates which are sufficiently spaced apart to define a charge path. At least one of the plates is substantially transparent to light. A light responsive dielectric layer and a separate dielectric layer, which is relatively unresponsive to light, are disposed within the charge path with the light responsive dielectric layer being positioned with respect to the transparent conductive plate to receive light passing through the plate. The light responsive dielectric layer changes in conductivity in response to the application of light thereto and thus effects variance of the capacitance of the capacitor structure.

This application is a continuation of application Ser. No. 376,926, filed June 22, 1964.

This application relates to a variable capacitor and the method of making same; more specifically, it relates to a capacitor variable in capacitance in response to variation in light incident thereto and to a method of making such a capacitor.

Various types of variable capacitors are known in the prior art and have a variety of applications. In most instances, variation is accomplished by change of the effective plate area of the capacitor or change of plate separation. Capacitors variable with light incident thereto have been proposed. In one instance, such a capacitor consisted of a multiplicity of photoconducting granules imbedded in a plastic matrix. In another instance, the capacitor consisted of a single crystal photoconductor with dual depletion layer contacts. These proposed light responsive prior art capacitors possess various disadvantages, the most prominent of which is their limitation on the amount of capacitance change which may be realized in a change from dark to light conditions. Moreover, it is difficult to fabricate such capacitors to predetermined desired characteristics.

Variable capacitors, responsive to light to change capacitance, may be used in applications to replace certain existing variable capacitors, as well as in a variety of new applications. An example of a specific application of a light sensitive capacitor is illustrated in U.S. Patent 3,029,346. Hereinafter, certain specific applications will be shown, e.g. providing a component on which an "AND" circuit or an "OR" circuit may be based, to name but two.

It has now been found, as is embodied in the present invention, that a capacitor capable of achieving a large capacitance change, comparatively larger than available by the prior art techniques referred to above, may be fabricated of two distinct dielectric layers, one of which is light sensitive and the other of which is light insensitive. Such a capacitor advantageously takes cognizance of the relationship referred to in more detail hereinafter that maximum capacitance change is achieved when the thickness of the insensitive dielectric is comparatively small, the thickness of the sensitive dielectric is comparatively large, the dielectric coefficient of the light insensitive dielectric is comparatively large, and the dielectric coefficient of the light sensitive dielectric is comparatively small. The prior art capacitors referred to above are unable to take advantage of the duo-dielectric relationship just mentioned. In the case of the photoconducting granule type, capacitance change is small because favorable comparative relationships between the dielectric coefficients and the effective distances of separation cannot be achieved. In a device having a depletion layer as one of the dielectrics, the capacitance change is determined solely by device thickness since the comparative ratio between the dielectric coefficients is equal to one. On the other hand, in a device having two dissimilar and distinct dielectric layers in accordance with the present invention, the capacitance change may take advantage of both the comparative dielectric coefficients and the comparative thicknesses of the dielectrics.

It is an object of the present invention to provide a variable capacitor capable of large capacitance changes between light and dark conditions; moreover, it is an object of the invention to provide such a capacitor that is comparatively simple to fabricate to predetermined conditions; it is yet another object to provide such a capacitor that may be optimized to perform over a wide bandwidth of frequencies or that will selectively perform at certain desired frequencies. A further object of the present invention is to provide various embodiments of variable capacitors, variable in capacitance with change in light incident thereto, which are adapted for a large variety of circuit applications. Still a further object of the present invention is to provide a method of making a capacitor which achieves the foregoing objects.

In accordance with this invention a unitary capacitor is provided which is variable in capacitance in response to variation in light incident thereto. The capacitor comprises at least two conductive plates which are spaced apart to define a charge path. At least one of these plates is substantially transparent to light. A light sensitive dielectric layer and a separate light insensitive dielectric layer are interposed to lie in the charge path between the plates. The light sensitive dielectric layer is positioned with respect to the transparent plate so that it receives light passed through that plate. The light sensitive dielectric layer possess the property of changing from being comparatively nonconductive in the dark to being comparatively conductive in the light.

In a specific preferred embodiment of the present invention the capacitor referred to in the preceding paragraph has its conductive plates oppositely disposed, the light sensitive dielectric layer and the separate light insensitive dielectric layer being sandwiched between the two plates.

In yet another specific preferred embodiment, the light sensitive dielectric and the light insensitive dielectric layer are spaced apart on a conductive substrate to which they are adhered.

A specific preferred embodiment of the present invention utilizes a particular conductive material for the transparent conductive plate adhered to the light sensitive dielectric layer. This conductive material consists of a major proportion of a metal selected from the group consisting of indium and gallium. Moreover, a specific preferred embodiment utilizes a light sensitive dielectric layer selected from the group consisting of cadmium sulfide, cadmium selenide and gallium arsenide, and a light insensitive dielectric is utilized which preferably comprises a major proportion of barium titanate.

The method aspect of the present invention provides a method of making a capacitor which is variable in capacitance in response to variation in light incident thereto which comprises the steps of: adhering a light transparent conductive material in intimate engagement with a light sensitive dielectric which changes conductance with change of light incident thereto, adhering a light insensitive dielectric to a surface of said light sensitive dielectric displaced from its boundary of adherence with said conductive material, and adhering a conductive material to a surface of said light insensitive dielectric which is spaced apart from its boundary of adherence with said light sensitive dielectric.

For a more complete understanding of the present invention and for further objects and advantages thereof, reference may now be had to the following description taken in conjunction with the accompanying drawings in which:

FIGURE 1 is a perspective view of a variable capacitor made in accordance with this invention;

FIGURE 2 is a cross-sectional view, taken along 2—2, of the capacitor of FIGURE 1;

FIGURE 3 is a perspective view of an alternative embodiment of the present invention wherein a light sensitive dielectric and four spaced apart light insensitive dielectrics are joined to a conductive substrate;

FIGURE 4 is a circuit diagram illustrating the effective circuit component provided by the capacitor of FIGURE 3;

FIGURE 5 illustrates, in section, an embodiment of the present invention which has a pair of spaced apart insensitive dielectrics abutting a single light sensitive dielectric;

FIGURE 6 is a circuit diagram illustrating the effective circuit component provided by the structure of FIGURE 5;

FIGURE 7 is a repetition of the structure of FIGURE 6, but illustrating a movable light beam impressed upon the transparent plate of the capacitor;

FIGURE 8 is a circuit diagram illustrating the effective circuit component provided by the structure of FIGURE 7;

FIGURE 9 illustrates, in section, an alternative embodiment of the present invention having a pair of light sensitive dielectrics separated by a light insensitive dielectric;

FIGURE 10 is a cross-sectional view of an embodiment of the present invention wherein two spaced apart light sensitive dielectrics are used in combination with an abutting light insensitive dielectric;

FIGURE 11 illustrates, in section, a capacitor having the same structure as that of the FIGURE 1 embodiment hereof, except for the addition of a light reflective interlayer between the light sensitive and light insensitive dielectrics;

FIGURE 12 illustrates, in section, a pair of light sensitive dielectrics in abutting contact, in combination with a light insensitive dielectric, providing an alternative form of the present invention which is selectively responsive to different light frequency ranges;

Figure 15:
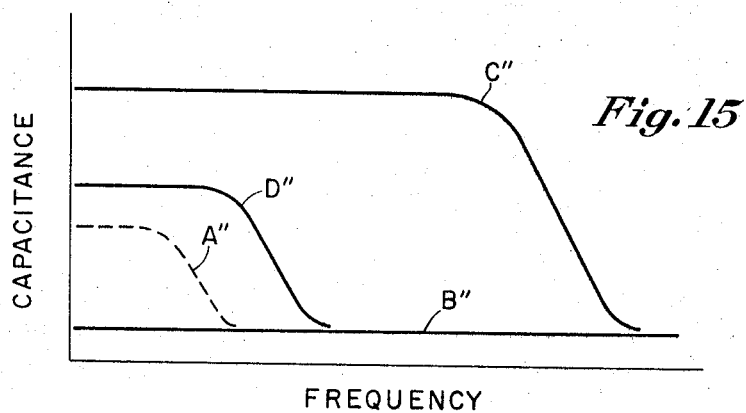
Figure 14:
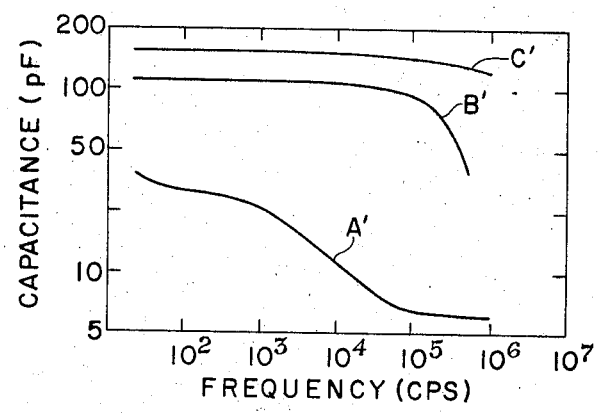

FIGURE 14 is a graph of capacitance as a function of frequencies of alternating electric current applied to excite a capacitor made in accordance with the embodiment of this invention described in Example 3 hereinafter; and FIGURE 15 is a graph of capacitance plotted against electrical excitation of a capacitor made in general accordance with this invention, with the amount of light as a parameter for various curves thereon, and illustrating the advantages of a selection of dielectric materials of a type that provide for essentially constant capacitance under dark conditions.

Referring now to FIGURES 1 and 2, the light sensitive capacitor, indicated generally at 31, illustrated therein, is in accordance with an embodiment of the present invention. The capacitor 31 has a pair of spaced apart generally circular plates 33 and 35, which are made of good conducting material. The wire 37 is joined to the plate 33 and the wire 39 is joined to the plate 35. These wires serve as conductive leads for the capacitor. A dielectric layer 41 and an adjacent dielectric layer 43 are sandwiched in between the plates 33 and 35, with the dielectric layer 41 being in good ohmic contact with the plate 33 and the dielectric layer 43 being in good contact with the plate 35. The plate 33 is substantially transparent whereby it will allow most of the incident light striking it, as indicated by $J_0$, to pass through it and strike the dielectric layer 41. The dielectric layer 41 is of a material that changes its conductivity in response to the light which it receives, conductivity in general increasing with increased intensity of light.

The dielectric layer 43 is joined to dielectric layer 41. Dielectric layer 43 is substantially insensitive to light. The plate 35 is opaque to light. It may be made of any of a variety of conventional good conductors, for example, it may be a film of gold.

In operation, when a power source is connected across the leads 37 and 39, the capacitor plates 33 and 35 become charged and a field is established between these plates. It will be appreciated that this field will cause any available charge carriers to move along the charge path which is provided by the perpendicular distance between the spaced apart plates 33 and 35. The two dielectrics, dielectric 41 which is light sensitive, and dielectric 43, which is light insensitive, lie consecutively along adjoining segments of this charge path. Available charge carriers will primarily be present in the light sensitive dielectric, and then only under those conditions where light is incident thereon. Under such conditions, most charge carriers will migrate along the charge path from the transparent plate 33 to the boundary with light insensitive dielectric 43 at which point further passage will be substantially blocked. A certain amount of charge carrier migration, though very little, will be present in both layers, even in the dark.

In the absence of light, the light sensitive dielectric 41 is substantially non-conductive and the dielectric medium between the plates 33 and 35 thus has a total thickness which may be considered to be the thickness of the dielectric 43 (distance from its interface with plate 35 to its interface with dielectric 41) plus the thickness of the dielectric 41 (distance from its interface with dielectric 43 to its interface with plate 33). On the other hand, under intense light, as represented at $J_0$ in FIGURE 2, the photoconductive material 41 responds to change its conductance (charge carriers are introduced by photon generation) to a much higher value and it becomes, as a comparative matter, a relatively conductive material. Viewed in a somewhat simplified manner for purposes of explanation, the effect is to shorten the separation between the active plates of the capacitor 31 to a value which approaches the thickness of dielectric 43 alone.

In any event, the characteristics provided by the structure of the capacitor 31 are such that the capacitance changes from a given initial level in the dark to a higher level in the presence of light. The maximum capacitance change which can occur can be as large as $$\frac{\Delta C}{C_D} = \frac{C_L - C_D}{C_D} = \frac{K'_1 \cdot d_2}{K'_2 \cdot d_1}$$

wherein $C_L$ is the capacitance of capacitor 31 in the light; $C_D$ is the capacitance of capacitor 31 in the dark; $\Delta C$ is the change in capacitance, i.e. $C_L - C_D$; $K'_1$ is the dielectric coefficient of dielectric 43, $K'_2$ is the dielectric coefficient of dielectric 41; $d_1$ is the thickness of dielectric 43 (perpendicular distance from its boundary with plate 35 to its boundary with dielectric layer 41); and $d_2$ is the thickness of dielectric 41 (perpendicular distance from its boundary with dielectric 43 to its boundary with plate 33). In order to achieve maximum capacitance change, it is seen desirable from the foregoing that the dielectric coefficient of dielectric layer 43 be quite large, that the dielectric coefficient of light sensitive dielectric layer 41 be quite small, that the thickness of the dielectric layer 41 be comparatively large, and that the thickness of the dielectric layer 43 be comparatively small. Under such conditions, a large capacitance change between light and dark will be realized.

The following examples of specific capacitors made in accordance with FIGURES 1 and 2 are offered by way of illustration only and are not to be taken as limiting:

*Example 1*

A capacitor is fabricated using substantially monocrystalline cadmium sulfide as the dielectric layer 41 of FIGURE 1. The thickness of the layer (or slice as it might more properly be called at this stage) is approximately 0.025 inch. A thin film of indium (approximately 0.001 inch thick) is diffused on the surface of the slice of cadmium sulfide. The technique used is that described in the article "Transparent Indium Contacts to Cadmium Sulfide," appearing in The Review of Scientific Instruments, vol. 31, No. 9, 992–994, September 1960. Either the indium vapor diffusion technique or the sputtering technique (wherein a low percentage of tin, from about 10% to 30%, is alloyed with the indium and the alloy oxygen sputtered upon the slice) described in that paper may be utilized. See also U.S. Patent 3,121,852, describing a satisfactory sputtering technique. For this example, the indium diffusion is used and it is preferred because of simplicity.

The diffused indium layer is lapped from the sides of the slice of cadmium sulfide, as well as from one of its faces (note that removal of the conducting layer on this face is optional since its presence will have little or no effect on the capacitor). The resulting product is a slice of cadmium sulfide having a thin layer of indium on the order of about 0.001 inch diffused on one of its faces. This thin layer of diffusion provides a transparent capacitor plate 33 which is in ohmic contact (carrier injecting relationship) with the light sensitive dielectric. The portion of the lapped slice of cadmium sulfide in which no substantial indium penetration has occurred provides the light sensitive dielectric layer 41. A conductive silver preparation (Du Pont No. 5584) is painted on the face of the cadmium sulfide layer 41 opposite the transparent diffused indium plate 33 and a slice of barium titanate (sold by the American Lava Corporation under the name "Alsimag T–128–A") of substantially the diameter of the layer 41, lapped to a thickness of approximately 0.005 inch, is pressed with one of its faces against the painted surface of light sensitive layer 41, and clamped into position until the conductive silver preparation dries. The barium titanate is thus firmly joined to dielectric 41 to provide a light insensitive dielectric layer 43 in accordance with this exemplary structure of the embodiment illustrated in FIGURES 1 and 2. A thin layer of gold is adhered to the exposed face of layer 43, opposite its face bonded to dielectric layer 41. This is accomplished by evaporation technique, as is well-known in the art. The gold layer, which provided the capacitor plate 35 (FIGURES 1 and 2), is approximately .0001 inch thick. Wires are bonded (by the silver preparation referred to above) to each of the plates 33 and 35 to provide the leads 37 and 39 (FIGURES 1 and 2). The resulting capacitor was tested under dark and light conditions, and at various frequencies. The capacitance-frequency relationship which resulted, with illumination a parameter, is illustrated on the curves of FIGURE 13.

Figure 13:
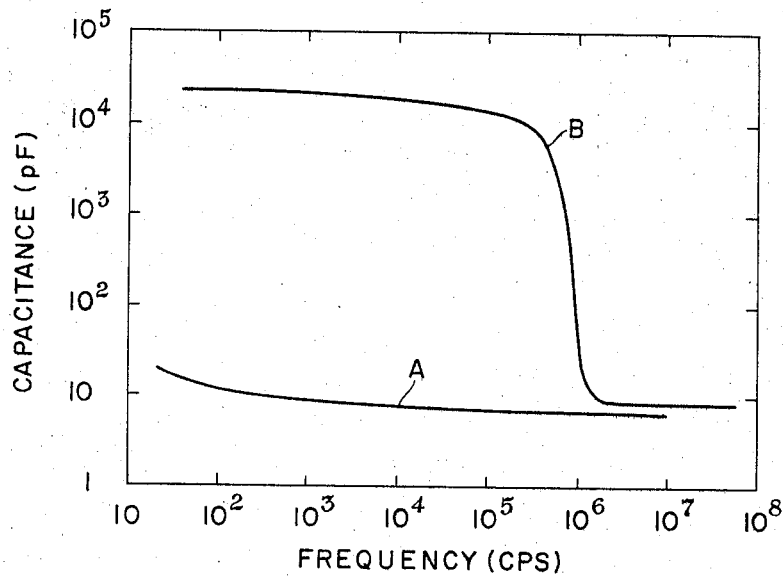
FIGURE 13 is a graph of capacitance as a function of frequencies of alternating electric current applied to excite a capacitor made in accordance with the embodiment of this invention described in Example 1 hereinafter.

Referring to FIGURE 13, the curve identified as A represents the capacitance, in picofarads, as a function of various frequencies of the alternating electric current in cycles per second applied to the circuit containing the capacitor of this Example 1 when dark conditions prevail (i.e. when no light is incident upon the transparent plate 33). It will be observed that only a small amount of variation in capacitance occurred with change in frequency. The curve captioned B shows the capacitance as a function of frequency under light conditions where 1900 foot-candles of intensity penetrate the light sensitive dielectric 41. In this example, which by no means is optimum since much smaller thicknesses could be utilized for the dielectric layer 43, it will be seen that a change in capacitance of about 2500 times occurs between the light and dark conditions. The bandwidth of frequency response in which substantial capacitance change occurs will be seen from FIGURE 13 to extend about $\frac{1}{10}$ megacycle.

*Example 2*

The procedure of Example 1 is repeated except a slice of cadmium selenide is used in place of the slice of cadmium sulfide employed therein. The resulting product is substantially the same as that of Example 1 and its capacitance change characteristics, as a function of frequency, follow substantially the same pattern as that illustrated is FIGURE 13 for the capacitor of the prior example. It should be noted, however, that the cadmium selenide capacitor has maximum response to a wave length of light to which the cadmium sulfide capacitor is almost insensitive (about 8500 angstroms). The response range of the cadmium sulfide is centered about a maximum of 5200 angstroms, by way of contrast.

*Example 3*

Example 1 is repeated except that the barium titanate acting as the insensitive dielectric 43 therein is replaced by a silicone plastic. This is accomplished, for example, by painting a layer of Union Carbide Corporation's silicone plastic preparation UCR–101 on the face of light sensitive layer 41 which is opposite the face carrying the transparent plate 33. The painted plastic preparation is allowed to dry in air and a film is formed that is on the order of about .0002 inch thick; thereafter, a thin layer of evaporated gold is applied to the face of the resulting plastic dielectric layer 43 which is opposite the boundary with dielectric 41 to provide the capacitor plate 35.

The resulting capacitor of this example is tested and is found to have a capacitance increase of about twentyfold with a useful frequency range extending to about ten megacycles per second. FIGURE 14 is a graph of the performance of the capacitor of this Example 3, illustrating the variation of capacitance (in picofarads) as a function of frequency of alternating current (in cycles per second) applied to excite the capacitor. Curve A' of FIGURE 14 shows the relationship between capacitance and frequency in the dark. Curve B' of FIGURE 15 shows the relationship between capacitance and frequency at 0.3 foot-candles light intensity. Curve C' of FIGURE 15 shows the relationship between capacitance and frequency at 3000 foot-candles intensity.

The comparatively small capacitance change in Example 3 (as compared to the prior examples) primarily results from the much smaller dielectric coefficient of the plastic forming the insensitive dielectric layer 43.

In understanding the present invention, it is of importance to note that interfacial polarization manifests itself as a natural consequence of conductance and dielectric coefficient differences between the dielectric materials involved. It is this polarization mechanism, and its dependence on photon generated carriers, which enables the light sensitive capacitor to perform. However, interfacial polarization phenomena can cause capacitors made in accordance with this invention to vary capacity with variation of the frequency of excitation current, even when behaving in the dark. Referring to curve A'' of FIGURE 15, the capacitance in the dark is shown to change over a rather substantial frequency bandwidth. Curve A'' is based on a duo-dielectric system (one sensitive dielectric layer and one insensitive dielectric layer) in which the following is greater than 1:

$$\frac{K'_1 \sigma_2(0, 0)}{K'_2 \sigma_1(0)}$$

wherein $K'_1$ is the dielectric coefficient of the insensitive dielectric layer; $K'_2$ is the dielectric coefficient of the sensitive dielectric layer; $\sigma_1(0)$ is the conductance of the light insensitive layer at zero current excitation frequency, and $\sigma_2(0, 0)$ is the conductance of the light sensitive dielectric layer in the dark and at zero current excitation frequency. The value of the foregoing expression is hereinafter referred to as the "relaxation time ratio in the dark." When the relaxation time ratio in the dark is less than one, capacitance variation wtih frequency will also occur. However, in the special case where the relaxation time ratio in the dark is equal to one, the situation arises where there is no frequency dependence of the capacitor in the dark. It should be appreciated that the reason for this is the equivalence of the dielectric relaxations of the two dielectrics, resulting in interfacial polarization being non-existent under the special condition of darkness. The special case where no interfacial polarization occurs in the dark is indicated by the constant capacitance curve B″ of FIGURE 15. Further referring to FIGURE 15, the curve C″ illustrates the maximum change in capacitance, as a function of electrical frequency, for a duo-dielectric capacitor in which the relaxation time ratio in the dark is equal to one. The capacitor is under substantially high illumination conditions for curve C″. The curve D″ of FIGURE 15 indicates the capacitance versus frequency at an intermediate level of illumination. Referring to curves C″ and D″, it is seen that a certain characteristic frequency response band is defined for each of the light intensity situations illustrated.

For curves C″ and D″, this band extends from zero frequency to the point on the curves where they tail-off from essentially constant capacitance for a given frequency. In contrast, if the relaxation time ratio in the dark is substantially different than one, the constant capacitance bandwidth must start at a frequency greater than zero and is accordingly shorter for a given light intensity parameter than if the relaxation time ratio in the dark were one. For this reason, it is preferred that the capacitor of this invention, for most applications, be constructed so that the expression referred to above be close to one.

As a practical matter, a quite substantial constant capacitance bandwidth results when the relaxation time ratio in the dark is in the general vicinity of one. To illustrate, consider the relatively constant capacitance in the dark exhibited by the structure of Example 1 as shown by curve A of FIGURE 13 compared to the variable capacitance in the dark exhibited by the structure of Example 3 as shown by curve A' of FIGURE 14. The relaxation time ratio in the dark for the structure of Example 1 is on the order of about 100 times the ideal value of one whereas the relaxation time ratio in the dark of the structure of Example 3 is on the order of $10^5$. The structure of Example 1 is considered to provide a device having a constant capacitance bandwidth which is substantially that which would be obtained under the idealized condition where the relaxation time ratio in the dark is one. On the other hand, the structure of Example 3 has such a narrow constant capacitance bandwidth that it is not considered to be acceptable where substantially optimized constant bandwidth characteristics are desired. Accordingly, a preferred value for the relaxation time ratio in the dark ranges within about two orders of magnitude from the idealized optimum value of one. It will be appreciated that for certain specific applications it may be desirable to have a capacitance-frequency response such that the constant capacitance bandwidth is narrow, in which case the relaxation time ratio in the dark may vary many orders of magnitude from the value one.

If desired, the relaxation time ratio in the dark may be made almost precisely one by the proper selection of materials. For example, a barium titanate material with a conductivity and/or dielectric coefficient adjusted by the presence of small quantities of lead, strontium, zinc, etc. replacing atoms of barium in the titanate may be used as the insensitive dielectric in combination with cadmium sulfide, cadmium selenide or gallium arsenide (the latter materials serving as the light sensitive dielectric) to provide a capacitor having a relaxation time ratio in the dark which is almost precisely one. Adjustment of the dielectric coefficient of a ceramic dielectric, such as barium titanate, may also be accomplished by varying firing of the ceramic material.

Turning now to the structure of FIGURE 3, at 44 therein is indicated generally an alternative embodiment of a capacitor made in accordance with this invention. Conductive substrate 45 serves as a conducting support for a light sensitive dielectric layer 46 and for light insensitive dielectric layers 47, 49, 51 and 53, which are spaced apart from each other as well as from dielectric layer 46. The conducting substrate 45 may be made of a variety of good conducting materials, for example, conductive glass (glass having a tin oxide layer deposited over it being satisfactory). The light sensitive dielectric layer 46 has a transparent plate 55 adhered to its upper surface and a wire 57 is conductively joined to the plate 55. Light insensitive dielectric layers 47, 49, 51 and 53 are each joined on their upper faces to capacitor plates 59, 61, 63 and 65. Wire leads 67, 69, 71 and 73 are joined to each of these capacitor plates. The layer 46 is bonded to the upper surface of the substrate 45, as by the conducting silver preparation referred to previously herein. Light insensitive dielectric layers 47, 49, 51 and 53 are similarly bonded to the upper surface of the substrate 45. The structure of condenser 44 provides four separate charge paths. These paths run from the plate 55 through the thickness of dielectric layer 46, along the conductive substrate 45 to each of light insensitive dielectric layers 47, 49, 51 and 53, respectively, and finally to the plates 59, 61, 63 and 65 of the respective light insensitive dielectric layers. It will be appreciated that the contact provided by conductive substrate does not effectively impair the charge paths described. A circuit diagram of the complex capacitor component 44 is illustrated in FIGURE 4, where it is seen that four separate capacitors 75, 76, 77 and 78 are effectively provided. These capacitors are, in effect, ganged to operate in response to the same stimulus, i.e. the light $J_o$ which passes through the transparent plate 55 to effect the light sensitive dielectric layer 46. It will be appreciated that the light sensitive dielectric layer 46 and its adjoining transparent plate 55 are in common to each of the capacitors illustrated in FIGURE 4, the other plate of each of the capacitors and its adjoining light insensitive dielectric layer being distinct. With this situation, the change in conductance of the light sensitive dielectric layer for each capacitor will be the same since the one layer is in common. On the other hand, the characteristics of each of the four light insensitive dielectrics may be different if desired. For example, they may be of different thicknesses or of different dielectric materials.

In the capacitor illustrated generally at 79 in cross section in FIGURE 5, the transparent plate 33' is joined to the dielectric layer 41', which is sensitive to light. A pair of spaced apart light insensitive dielectric layers 81 and 83, respectively, are provided in good contact with the dielectric layer 41' opposite its contact with plate 33'. Plates 85 and 87 are joined to the surfaces of light insensitive dielectric layers 81 and 83, opposite the boundary of these dielectrics with light sensitive dielectric 41'. Wires 89 and 91, respectively, are joined to capacitor plates 85 and 87 to provide conductive leads therefrom. A wire 92 is conductively joined to the transparent plate 33' to provide a conductive lead from that plate. When the plate 33' is subject to incident radiation, as represented in FIGURE 5 by parallel rays $J_o$ directed over the face of plate 33', a ganged in-phase capacitor circuit component is provided as is represented schematically in FIGURE 6 by the ganged capacitors 93 and 94. It will be appreciated that two separate charge paths are provided by the configuration of FIGURE 5. One of these charge paths is from the transparent plate 33' through the light sensitive dielectric layer 41' and thence through the light insensitive dielectric layer 81 to the plate 85; the other is through the transparent plate 33', through the light sensitive dielectric layer 41', then through the light insensitive layer 83, and finally to plate 87. With equal intensitivity of light over the face of the transparent plate 33', the capacitance of the two effective capacitors 93 and 94 provided by the configuration of FIGURE 5 (as represented schematically in FIGURE 6) will be the same and change in the same respect and in phase provided that the dielectrics 81 and 83 are of the same material and the same thickness. In some instances it may be desired to vary the thickness and/or material of the dielectrics 81 and 83 in order to provide for a different capacitance for each of effective capacitors 93 and 94.

FIGURE 7 repeats the illustration of the capacitor 79, of FIGURE 6. However, the incident $J_o$ is in this instance a concentrated beam (as directed through a slot, for example) which is movable with respect to the transparent plate 33' so it will impinge on the plate at various points thereon in accordance with a predetermined pattern of movement. The movement pattern indicated in FIGURE 7 is generally oscillatory between the upper and lower faces of the transparent plate, as viewed in FIGURE 7. The result is to provide a circuit component consisting of ganged capacitors 97 and 99 (see FIGURE 8) varying in phase relationship in accordance with the oscillations along the path 95.

Another embodiment is illustrated in cross section in FIGURE 9. Therein, the capacitor 101 consists of two light sensitive dielectric layers 103 and 105 with a light insensitive dielectric layer 106 sandwiched therebetween. The dielectrics 103 and 105 are joined to the opposite faces of dielectric 106, as by techniques previously described herein. Capacitor 101 has oppositely disposed, spaced apart plates 107 and 109, both of which are transparent to light. These plates are initimately adhered to the respective outer faces of light sensitive dielectrics 103 and 105. Wires 111 and 113 are joined to plates 107 and 109, respectively, to provide conductive leads therefrom.

In operation, the capacitor 103 (FIGURE 9) will be subject to a variation of several orders of magnitude when incident light $J_{o1}$ and $J_{o2}$ are directed to the transparent capacitor plates 107 and 109. The resulting photoconductive effect on layers 103 and 105 will provide a change of several orders of magnitude in the capacitance of the variable capacitor 101. This is in contrast to the situation where light impinges upon either plate 107 or plate 109, but not on both. In the latter situation some capacitance change will be realized by virtue of the photoconductive effect of the single light sensitive layer receiving light, however, this change will be quite small indeed compared to the first mentioned situation where light is passed through both plates to simultaneously affect the respective layers of light sensitive dielectric. The result is that an "AND" circuit component is effectively provided.

The embodiment of this invention illustrated in FIGURE 10 effectively provides an "OR" circuit component. In FIGURE 10, the capacitor 121, illustrated in cross section, consists of a pair of light sensitive dielectric layers 123 and 125 which both adjoin a common face of light insensitive dielectric layer 127. The opposite face of the light insensitive dielectric layer 127 carries the plate 129, which has a lead 130 adjoined thereto. Transparent plates 131 and 133 are provided on the outermost faces of the light sensitive dielectric layers 123 and 125, respectively. These plates have wires 135 and 137, respectively, joined to them to provide conductive leads. The capacitor 121 is seen to have two charge carrier paths, i.e. one being the path from plate 131 through the thickness of light sensitive dielectric layer 123, thence through the layer of light insensitive dielectric layer 127, and finally to plate 129, and the other being the path from plate 133, through the light sensitive dielectric layer 125, then through light insensitive layer 127, and finally to plate 129. The configuration described for capacitor 121 provides for a substantial change (one of several orders of magnitude) in capacitance in response to light directed to transparent plate 131 as well as when light strikes transparent plate 133 (see light rays $J_{o1}$ and $J_{o2}$ in FIGURE 10). Moreover, in the case where light strikes both the plates 131 and 133, the capacitance change experienced will be of the same order of magnitude as when only one of the plates receives light. With the characteristics and sizes of the dielectric layers 123 and 125 being the same, the comparative effect on light change produced by light to either transparent plate 131 or 133 as compared to light to both, will be seen to be only about twofold. Compared to the many orders of magnitude change experienced by light striking either face, this is a small change indeed. It is seen that the effective circuit component provided by capacitor 121 is an "OR" type.

The capacitor represented generally at 141 in FIGURE 11 has the same in construction in all detail as the capacitor illustrated in FIGURES 1 and 2, with a single exception. The exception is an interlayer of reflective material 143 which is interposed between the light sensitive dielectric 41'' and light insensitive dielectric 43''. This reflective interlayer effectively provides a reflective surface from which light rays may reflect and pass back through the light sensitive dielectric layer 41''. Note in FIGURE 11 the incident ray of light $J_o$, and its reflection $J_{o'}$. Assuming perfect efficiency of such reflective mechanism, it will be seen that light will substantially double its exposure to the light sensitive dielectric through which it passes and returns. In practice, somewhat less than the theoretical is achieved. A satisfactory reflective layer may be provided by covering the light sensitive dielectric inner face with a host of materials, for example, with a layer of evaporated aluminum.

Referring to FIGURE 12, the capacitor 151 consists of a light transmitting plate 153 bonded to a first light sensitive dielectric 155, the other face of which is in turn bonded to a second light sensitive dielectric layer 157. In turn, light sensitive dielectric layer 157 is joined to light insensitive dielectric layer 159. The outermost face of light insensitive dielectric 159 is bonded to the conductive capacitor plate 161. Wires 163 and 165, respectively, are joined to plates 153 and 161, respectively, to provide conductive leads thereto. Incident light $J_o(\lambda_1)$, of one wave length, and $J_o(\lambda_2)$ of a different wave length is schematically illustrated as being directed to plate 153 in FIGURE 12. Dielectric materials 155 and 157 are selected so that they are responsive to different wave lengths of light. Accordingly, the different wave lengths selectively influence a given one of the active dielectrics, with a net mixing effect resulting. Maximum sensitivity is expected when both wave lengths are present. An example of different dielectric materials which are light sensitive and respond to different light wave lengths is provided by cadmium sulfide and cadmium selenide. The response of cadmium sulfide is more or less centered about a maximum response at a wave length of about 5200 angstroms, while the response of cadmium selenide to light is more or less centered around a maximum of about 8500 angstroms. Accordingly, the device of FIGURE 12 may be made using these two materials for the two layers of light sensitive dielectric.

As used herein, the expression "ohmic contact" refers to a contact which does not substantially impair the free injection of charge carriers into the medium for which contact is provided.

In the structure and practice of the present invention, a wide variety of materials may be utilized for dielectrics. For example, the insensitive dielectric may vary from a variety of solid materials to a layer of air, which may be desirable under some conditions. Ceramic dielectrics, for example, barium titanate are quite good for many applications. The light sensitive dielectric can also be a variety of materials, examples being cadmium sulfide, cadmium selenide, and high resistivity gallium arsenide. Referring to the gallium arsenide, a high resistivity material may be obtained when gallium arsenide crystal is prepared with a trace quantity of copper and/or silicon dopant present, e.g. a few parts per million.

Various materials, having variable degrees of transparence, may be utilized in the practice of the present invention to provide the transparent plate or plates. The preferred materials are indium and gallium, the former of which is particularly appropriate for many applications.

It is understood that the term "transparent" is a relative one since no perfectly transparent material exists; thus, that term is used herein in a relative sense to indicate the property of a material that permits light to pass therethrough. Accordingly, partially transparent, as well as translucent materials, are intended to be included within the meaning of the term "transparent."

When referring to capacitors in accordance with the structure of this invention, the art recognized term "plate" is to be understood to refer to that element of a capacitor in a general sense rather than to a specific physical configuration. That is, the term "plate," when used in conjunction with structural descriptions of a capacitor herein, including the claims, is not intended to limit the structure to a physical plate-like configuration. For example, capacitor plates may be tubular members or of any other desired shape.

It is seen that the present invention provides a variable capacitor which is responsive to change of light incident thereto. Such capacitor includes a light sensitive dielectric layer and a distinct light insensitive dielectric layer. Moreover, it is seen that a method for making such a capacitor is provided.

Having described the invention in connection with certain specific embodiments thereof, it is to be understood that further modifications may now suggest themselves to those skilled in the art and it is intended to cover such modifications as fall within the scope of the appended claims.

What is claimed is:

1. A unitary capacitor variable in capacitance in response to variation in light incident thereto, said capacitor comprising:
   at least two conductive plates spaced apart to define a charge path therebetween, at least one of which plates is transparent to light;
   a light sensitive dielectric layer and a separate light insensitive layer interposed to lie in the charge path between said plates with said light sensitive dielectric layer being positioned with respect to said one plate which is transparent to receive light passed through said one plate;
   said light sensitive dielectric layer possessing the property of changing from being comparatively non-conductive in the dark to being comparatively conductive in the light;
   a conductive substrate spacing apart and supporting said dielectric layers.

2. The unitary capacitor of claim 1 further comprising:
   at least one additional conductive plate and one additional light insensitive dielectric layer in ohmic contact with said additional plate, said one additional light insensitive dielectric layer being supported on said substrate in a position spaced apart from said light sensitive dielectric layer and the first mentioned light insensitive dielectric layer with said additional plate separated from said substrate, whereby a charge path between the one plate which is transparent and the said additional plate is provided in addition to the first mentioned charge path.

3. A unitary capacitor variable in capacitance in response to variation in light incident to said capacitor, said capacitor comprising:
   at least a pair of spaced apart conductive plates and a third plate spaced apart and oppositely disposed from said pair of plates to define two separate charge paths, one extending from one plate of said pair to said third plate and the other extending from the other plate of said pair to said third plate, each of said pair of plates being transparent to light;
   at least a pair of spaced apart light sensitive dielectric layers interposed to lie with one in one of said charge paths and the other in the other of said charge paths between the pair of plates and the said third plate;
   a light insensitive dielectric layer disposed intermediate said pair of light sensitive dielectric layers and said third plate and positioned in each of said charge paths;
   each of said light sensitive dielectric layers possessing the property of changing from being comparatively non-conductive in the dark to being comparatively conductive in the light.

4. A capacitor adapted to vary in capacitance in response to light incident thereto, said capacitor comprising:
   at least two electrically conductive plates spaced apart to define a charge path therebetween, at least one of which plates is transparent to light; and
   a light responsive dielectric layer and a separate light insensitive dielectric layer interposed to lie in the charge path between said plates, said light responsive dielectric layer being substantially thicker than said light insensitive dielectric layer, thereby defining a major portion of said charge path, and being positioned with respect to said one plate which is transparent to receive light passed through said one plate;
   said light responsive dielectric layer having a substantially smaller dielectric coefficient than said light insensitive dielectric layer;
   said light responsive dielectric layer possessing the property of changing from being comparatively non-conductive in the absence of exposure to light to being comparatively conductive in the presence of light so as to thereby vary the conductivity of said charge path.

5. The capacitor of claim 4 further comprising a second light responsive dielectric layer interposed in said charge path, and wherein said first light responsive dielectric layer is relatively highly responsive to light of a first predetermined frequency, wherein said second light responsive dielectric layer is relatively highly responsive to light of a second predetermined frequency, and wherein said second light responsive dielectric layer is disposed between said first light responsive dielectric layer and said light insensitive dielectric layer, whereby the conductivity of said charge path varies in response to the presence of light of said first predetermined frequency and in response to the presence of light of said second predetermined frequency.

6. The capacitor of claim 4 further comprising a second light responsive dielectric layer interposed in said charge path, and wherein said at least two electrically conductive plates are both relatively transparent to light and wherein said light insensitive dielectric layer is disposed intermediate said first light responsive dielectric layer and said second light responsive dielectric layer, whereby the conductivity of said charge path varies in response to light incident upon either of said at least two electrically conductive plates.

7. The capacitor of claim 5 further comprising a second light responsive dielectric layer interposed in said charge path, and wherein said first light responsive dielectric layer and said second light responsive dielectric layer both adjoin a common face of said light insensitive dielectric layer, said common face being spaced from one of said at least two electrically conductive plates by said light insensitive dielectric layer, and wherein said at least one electrically conductive plate which is transparent to light comprises a first light transparent electrically conductive plate and a second light transparent electrically conductive plate, said first light transparent electrically conductive plate being carried on a face of said first light responsive dielectric layer remote from said common face of said light insensitive dielectric layer and said second light transparent electrically conductive plate being carried on a face of said second light responsive dielectric layer remote from said common face of said light insensitive dielectric layer.

8. The capacitor of claim 4 wherein said light responsive dielectric layer is positioned directly adjacent said at least one electrically conductive light transparent plate and wherein said light insensitive dielectric layer is positioned intermediate said light responsive layer and another of said at least two electrically conductive plates.

9. The capacitor of claim 4 wherein said light responsive dielectric layer is in ohmic contact with said at least one electrically conductive light transparent plate, and wherein said light insensitive dielectric layer is sandwiched between said light responsive dielectric layer and another of said electrically conductive plates.

References Cited

UNITED STATES PATENTS

| | | | |
|---|---|---|---|
| 2,277,013 | 3/1942 | Carlson | 250—211 X |
| 2,837,661 | 6/1958 | Orthuber et al. | 250—211 X |
| 2,837,660 | 6/1958 | Orthuber et al. | 250—211 X |
| 2,870,338 | 1/1959 | Gillson | 250—211 X |
| 2,912,592 | 11/1959 | Mayer | 250—211 |
| 2,985,757 | 5/1961 | Jacobs et al. | 250—211 X |
| 3,069,551 | 12/1962 | Haine | 250—213 |
| 3,112,404 | 11/1963 | Reed | 250—213 |
| 3,194,967 | 7/1965 | Mash | 317—246 X |
| 3,198,012 | 8/1965 | Argue et al. | 250—211 X |
| 3,229,105 | 1/1966 | Mestwerdt et al. | 250—213 |
| 3,244,891 | 4/1966 | Orthuber | 250—213 |
| 3,248,550 | 4/1966 | Szepesi | 250—213 |
| 3,273,033 | 9/1966 | Rossmeisl | 317—258 |
| 3,283,194 | 11/1966 | Rulon | 317—258 X |
| 3,295,002 | 12/1966 | Amans | 250—211 X |
| 3,315,080 | 4/1967 | Kohashi | 250—213 |
| 3,315,111 | 4/1967 | Jaffe et al. | 250—211 X |
| 3,344,280 | 9/1967 | Martel | 250—211 X |

OTHER REFERENCES

Bube: Photoconductivity of Solids, Wiles & Sons, New York, QC 612 P 5B8, c. 3, p. 230, received Sci. Lib., Jan. 22, 1962.

RALPH G. NILSON, *Primary Examiner.*

M. A. LEAVITT, *Assistant Examiner.*

U.S. Cl. X.R.

250—213; 317—246, 258